Figure 1:
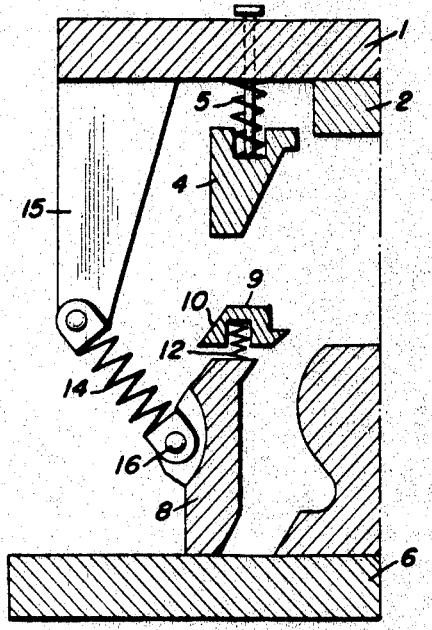

June 25, 1968  E. E. ROLLMAN ET AL  3,390,213
METHOD OF MANUFACTURE OF FOOTWEAR
Original Filed Aug. 15, 1957  2 Sheets-Sheet 1

INVENTORS
ERNEST ROLLMAN
ANTON LIEBSCHER AND
ANDREW SZERENYI

BY *Dan J. Hatfield*

ATTORNEY

June 25, 1968  E. E. ROLLMAN ET AL  3,390,213
METHOD OF MANUFACTURE OF FOOTWEAR
Original Filed Aug. 15, 1957

INVENTORS
ERNEST ROLLMAN
ANTON LIEBSCHER AND
ANDREW SZERENYI
BY
ATTORNEY 3,390,213
METHOD OF MANUFACTURE OF FOOTWEAR
Ernest E. Rollman, Anton Liebscher, and Andrew Szerenyi, Waynesville, N.C., assignors to Ro-Search, Inc., Waynesville, N.C.
Original application Aug. 15, 1957, Ser. No. 678,412, now Patent No. 3,098,308, dated July 23, 1963. Divided and this application Sept. 17, 1962, Ser. No. 224,607
5 Claims. (Cl. 264—45)

This is a division of application Ser. No. 678,412, filed Aug. 15, 1957 and now U.S. Patent No. 3,098,308.

The invention refers to the manufacture of molded articles such as soles and heels molded directly onto uppers of shoes.

It is customary to mold and cure soles of rubber or of other elastomers onto uppers of shoes which have been prepared by stitching, and by lasting them with an insole according to any of the various lasting methods such as Goodyear or McKay lasting, cement lasting, tack lasting, etc. Such uppers are sometimes also provided with a welt, formed by a leather strip stitched to the lower rim of the upper.

One object of the invention is to use a device which allows the molding of the sole and heel to uppers be they with or without welt and with or without insole, i.e., lasted or not lasted. Other objects of the invention refer to improvements in the methods of manufacture, as described hereafter in connection with the drawing.

Figure 2:
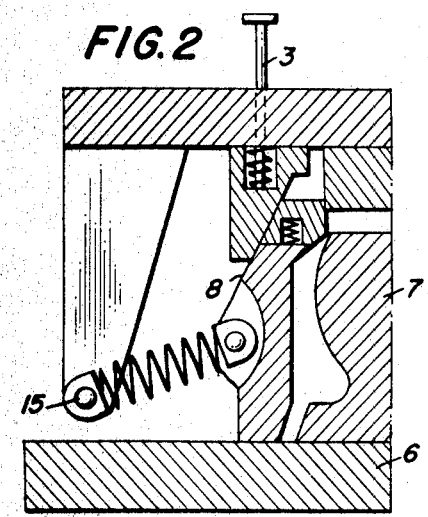
Figure 3:
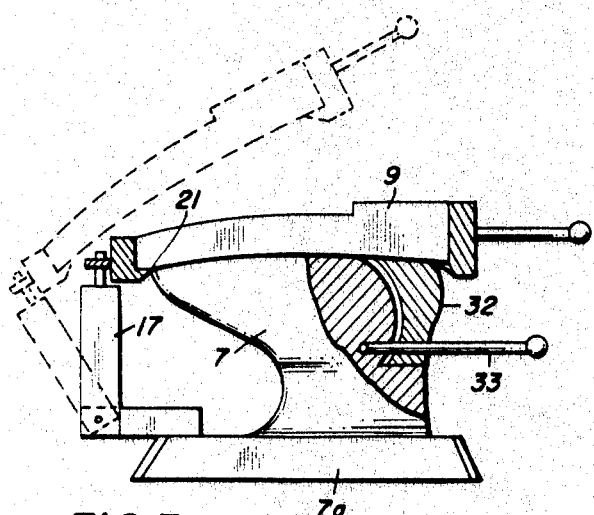
Figure 4:
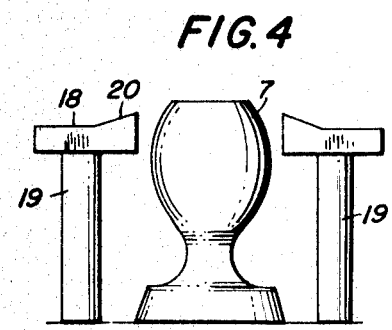
Figure 5:
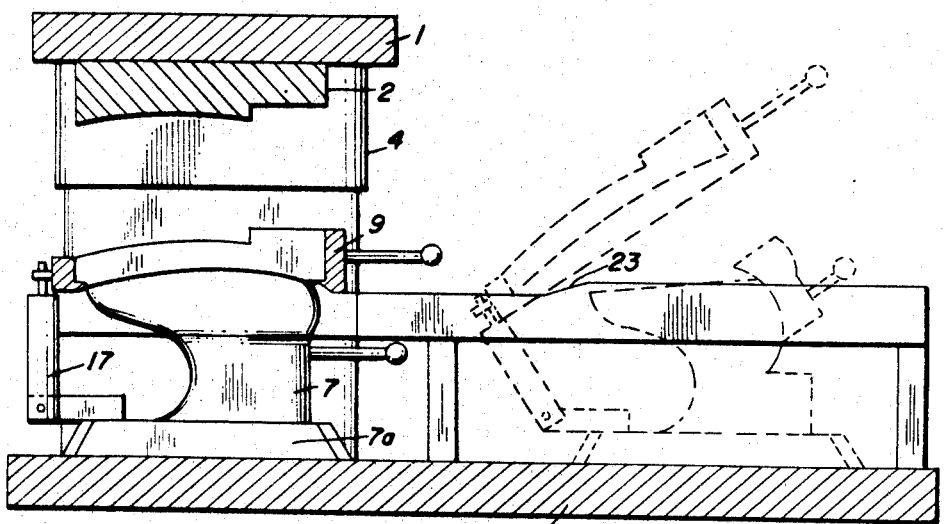
Figure 6:
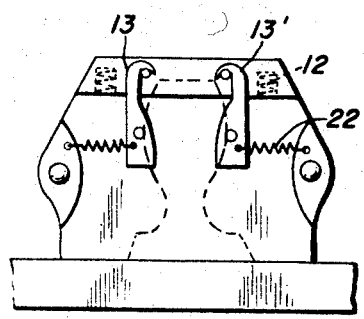
Figure 7:
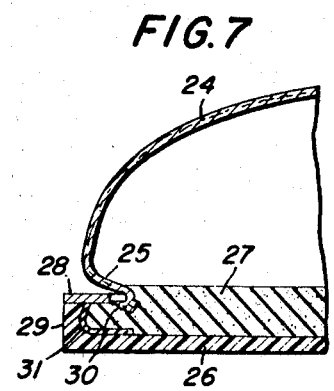

The drawing shows in FIG. 1 the molding apparatus used according to the invention in a cross section in the open position, while FIG. 2 shows the same device in the closed position; in both views for the sake of clarity the shoe itself with the sole is not shown. FIG. 3 shows a side view of the last forming part of the molding device, while FIG. 4 shows a front view of the last with the guides for the frame. FIG. 5 shows another arrangement of guides in a side view presenting the molding and the unloading position. FIG. 6 shows a front view of the frame with latches holding it against the frame carrier. FIG. 7 shows a cross section of one realization of a shoe according to the invention.

The molding device used according to the invention comprises an upper platen 1 which carries a piston like sole bottom plate 2 and by means of pull rods 3 a clamp 4. Springs 5 between the platen 1 and the clamp 4 allow the clamp to move downwards ahead of the platen.

The other platen 6 supports a last 7, a divided frame carrier 8, and a frame 9. The frame parts 9 are provided on the outside with tapered surfaces 10, matching tapered surfaces 11 on the inside of the clamp 4. It is preferred to hold the angle of these surfaces 10, 11, so small as to make these surfaces self-locking.

For the manufacture of certain types of footwear with prelasted uppers springs 12 are provided between the frame parts 9 and the frame carrier 8, which tend to lift the frame up, away from the frame carrier and from the last 7 and latches 13 and 13' are provided to hold the frames down to the frame carrier until the molded sole is free of the frame. The movement of the frame carrier parts 8, 8' to and from each other is obtained through links 14, hinged on one end to extensions 15 of the platen 1, on the other end to pins 16 of the frame carriers. The links consist of stiff coil springs which transmit either pressure during the closing or tension during the opening of the molds.

For the manufacture of shoes which are lasted within the molding device, the upper to which a welt has been stitched, is placed upon the last shown in FIG. 3. The frame 9, carried by the lever 17 can now be opened and moved below the welt into a substantially horizontal position, where the frame halves are supported by the lower part 18 of the guides 19. As the frame halves are closed while moving closer to the upper on the last, the inclined surfaces 20 of the guides 19 will automatically lift the frame so that the completely closed frame sits exactly at the desired final level without special attention or skill on the part of the operator. The material for the sole and heel can now be placed into the mold cavity formed by the last and the frame and this assembly be moved into the molding position. Thereafter the movement of the platen begins, caused usually by the opening of a valve in a hydraulic circuit.

As the downwards movement of the platen 1 begins, the springs 14 force the frame carrier halves against each other, bringing with it a preliminary closing of the frame halves. While the frame carrier comes now to a standstill, the movement of the platen continues (under compression of the springs 14). The tapered surfaces of the clamp come now into contact with the corresponding surfaces of the frame halves and force them together and lock them so as to pre-stress the divided frame against the pressure of the rubber during the molding, which tends to separate the frame parts and tends to cause unsightly spew lines. In the manufacture of shoes with prewelted uppers, the springs 19 between frame and frame carrier are not inserted, so that the frame parts rest directly on the frame carrier. The clamp 4 now also comes to rest, but the platen continues its downward movement and forces now the sole bottom plate 2 into the mold cavity, thereby molding sole and heel under heavy pressure onto the upper and welt. When the desired end position is reached—and after holding it for any desired curing time—the movement of the platen is reversed.

After holding the platen 1 and with it the sole bottom plate 2 in position to complete the cure or vulcanization, the movement of the platen starts again. As might be seen from FIG. 2, the hinge points 15 of the springs are moving during the molding cycle even below the level of the hinge points 16 on the frame carrier, without danger that the frame carrier halves might separate. The use of springs between the hinge points also allows a very compact design of the molding device even with a relatively long stroke of the platen. As the platen 1 moves upwards, the sole bottom plate will separate itself from the molded sole and thereafter the clamp 4 will free itself from the frame. Only thereafter, assured by the timing springs 14, will the frame carrier halves separate, so that the last can be moved from the molding position onto the apron of the device. The frame is then still closed and held between the lower edge of the upper and the welt. The frame can now be opened and swings away from the last as shown in FIG. 3. The completed shoe can be removed and the cycle repeated.

If the device used according to the invention is to be used for shoes without welt, the lever 17 is eliminated and the frame halves located on the respective halves of the frame carrier. In addition, spring 10 between the frame halves and the frame carrier and latches 13 are provided, as shown in FIG. 6. These springs hold the frame halves slightly above the level of contact between their lip 21 and the upper, until the frame carriers closed the frame. This eliminates any danger of scraping or otherwise damaging the upper during closing. Only after the clamp has locked the frame halves together—but before the sole bottom plate exerted any pressure on the sole material—will be continued movement of the platen cause a compression of the springs 10 and bring the lips (after a movement in the press direction) to rest on the upper. As this position is reached the latches 13 come into action, helped by tension springs 22, and hold the frame down even after the clamp 4 lifts and the downwards pressure ceases. The frame halves with the respective frame carrier will move, after the completion of the molding, horizontally away from the shoe without danger of tearing the sole from the upper. After the last with the shoe is moved into the loading position away from the frame, the latches can be freed by hand so that the frames are ready for the next molding cycle. The guides 19, as described before, are used to move the frame prior to the molding in addition to their normal (horizontal) closing movement also in a direction vertically thereto. The inclined surfaces of the guides might be in action during the closing of the frame, as shown in FIG. 4, or the guides might be used to move the already closed frame while moving the frame with the last from the loading position into the molding position, as shown in FIG. 5. There the inclined surfaces 23 are arranged to lower the frame towards the last as the latter moves into the molding position. The movement might be in either case a lifting or lowering to suit the requirements of the shoe bottom. The fact that, according to the invention, the frame carriers close before the frame presses against the upper on the last is used, as a further improvement, to assure correct location of the frame in relation to the last. This is obtained, as might be seen from FIGS. 1 to 3, by providing tapered surfaces at the foot of the last, and mating surfaces of the frame carrier halves. As the latter close, they will move the last into exactly the desired position in relation to the frame. The time delay assured by the springs 14 permits this to happen before the frame is pushed downwardly against the upper on the last. While the inclination of the tapered surfaces as shown secures only the positioning of the last in a horizontal plane it is obvious that such tapered surfaces can also be used to secure the positioning in a vertical direction of the last in relation to the frame.

It is preferred to use, for the manufacture of shoes to be lasted in the vulcanization device, a last with a movable heel piece, as shown in FIG. 3. The dividing surface between the last 7 and the heel piece 32 is cylindrical so that in the foreshortened as well as in the stretched position there is no gap between the heel piece and the adjoining parts of the last, which might tend to mark on the upper. A cantilever 33 is arranged to permit the exertion of considerable force when stretching the upper by pushing the heel piece into place.

The molding device described above permits two molding positions of the sole bottom plate, an initial position with very high pressure, close to the last, and a second position corresponding to the desired final thickness of the sole, still without essential loss of pressure. The initial molding and curing causes the formation of a solid sole shell, while the expansion of the mold cavity by the forementioned partial lifting of the sole bottom plate and holding there permits the formation of a porous mass in the center of the sole. This is helped by filling the mold with a mix for a porous rubber wrapped in sheets of a mix for non-porous rubber. This permits the further improvement of the shoes according to the invention in that an outer shell of solid, relatively hard elastomer and an inner sole of softer material can be integrally molded. The sole shell will adhere to the upper as it is molded thereto under high pressure. As shown in the cross section in FIG. 7 a sole shell 26 including also the side rim 29 is integrally molded to the upper 24 with the welt 28. The material of the inner part of the sole might be the same as used for the outer shell, but with the addition of one of the many known blowing agents so as to facilitate the expansion thereof after the outer sole shell has hardened. A strip 31 of prevulcanized rubber is used to contain the porous rubber filler 27 during the flow of the rubber mix for the sole shell. By blowing the filler and vulcanizing it before the molding flow of the material of the sole shell has ended, it is possible to obtain in a single operation a fully resilient sole with a fully molded sole shell without weakening of the lower sole edge which is subjected to heavy wear. In other instances it might be preferred to use some less expensive mix for the inner part of the sole such as regenerated rubber with light weight filler, so as to reduce the weight of the completed sole. The invention provides the use of a highly accelerated mix if the thickness of this inner part of the sole would reduce heat penetration and thereby cause undesirable slowdown in the vulcanization of the entire sole. Through a few tests the quantity of the vulcanizing agent can be determined which is required to obtain complete vulcanization of the inner part of the sole, which might be ⅜ of an inch thick, while the vulcanization of the outer sole shell occurs, which might be only ⅛ of an inch thick.

The term "rubber" is used here for natural as well as synthetic elastomers, which might be cured by heat and pressure or might be self-curing.

The design of the molding device according to the invention as described above, more specifically the clamp fastened to the platen and the springs to bring the hinge points for the frame carrier to or even beyond level allow the use of much higher pressures than hitherto used without distortion of the frames and unsightly spew lines. To lessen the strain on the molding device and to improve the footwear itself, a further realization of the invention provides that if high styrene-butadiene mixes for very hard soles are to be used, such molding mixes are temporarily, for the period of flow during molding, softened by adding low molecular weight polyesters. It has been found that such addition decreases the pressure required for adequate molding flow very substantially without decreasing the hardness of the mix after molding and vulcanization. This is more clearly shown by the following examples:

A standard rubber mix for molding of soles directly to the upper might consist of the following components:

|  | Parts |
| --- | --- |
| Pale crepe | 100 |
| Zinc oxide | 6 |
| Vegetable fibre | 40 |
| Lithopone | 35 |
| Magnesium carbonate | 7½ |
| Wood rosin | 2 |
| Petroleum jelly | 2 |
| Stearic acid | 1 |
| Vulcanizing agents | 4½ |

Such mix, cured 15 minutes at 302 deg. F., produces a sole with a specific gravity of 1.36, a Shore Hardness of 58 and an abrasion resistance (Du Pont) of 8 cm. loss per hour. A molding pressure of 300 p.s.i. is necessary to assure complete filling of the mold and adhesion of the rubber to the upper.

According to the invention the sole is molded from a mix of the type as follows:

|  | Parts |
| --- | --- |
| Smoked sheet | 50 |
| High styrene butadiene copolymer (such as sold under the designation of Polysar SS–250 by the Polymer Corporation of Canada) | 50 |
| Zinc oxide | 4 |
| Calcium silicate | 75 |
| Stearic acid | 1 |
| Vulcanizing agents | 6½ |
| AC Polyethylene (as sold by Allied Chemical Co., New York) | 7 |

A cure of 8 minutes at 316 deg. F. produces a sole with a specific gravity of 1.28, a Shore Hardness of 93 and an abrasion resistance of 1.7.

A molding pressure of less than 300 p.s.i. is permissible for the above described rubber mix, as the flow quality during molding was increased about 30%. It was found that substantial quantities of the low molecular weight polyester can be added to the mix, in proportions from 10 to 75% of the high styrene-butadiene copolymers, without reducing essentially the desired high hardness of the vulcanized sole.

The integrally molded shell soles with filler as described above, adhere very well when molded to uppers of leather or canvas. If the uppers consist of synthetic material, such as closed fabric from acrylic threads or vinyl sheeting, it has been found that rubber-like elastomers do not adhere always satisfactorily. The invention provides then that at least the mix for molding of the sole shell contains a very high percentage of low molecular weight polymers which are derivatives of diisocyanate. The other parts of the mix for the sole shell might then consist essentially of other elastomers be they compatible or not compatible with the material of the upper.

The following is an example of a satisfactory mix for the forming of a sole molded directly on an upper:

A prepolymer mix is prepared, comprising

| | Parts |
|---|---|
| Polyester resin (such as sold by Paraples AP 148 by Rohm & Haas, Philadelphia) | 100 |
| Toluene diisocyanate (such as sold as Hylene TM by Du Pont, Wilmington) | 35 |
| Emulsifying agent | 1 |
| Catalyst (N-methyl morpholine) | 1.3 |
| Water | 2.4 |

The prepolymer mix and the catalyst mix are combined in the proportion 135 to 4.7 and filled into the mold. Only enough pressure is required to assure the complete filling of the details of the mold cavity, and the mixture is self curing.

In view of the costs it is desirable to use smaller amounts of poly-isocyanates and it has been found that as little as 5% of it added to the mix will assure adherence to uppers of synthetic material. Further savings are obtained by providing that only the outer shell of the sole contains poly-isocyanates in the manner as described above, for the manufacture of shell soles molded integrally with a filler.

What we claim is:

1. The method of manufacturing footwear which includes the steps of placing a shoe upper and a pressure moldable elastomeric material including a blowing agent in a mold, closing the mold, applying pressure to the elastomeric material in the mold to mold the same to the shoe upper, thereafter enlarging the mold and thereby reducing the pressure on the elastomeric material to permit the remaining portion of the material to expand in the mold to form an inner porous mass, maintaining the enlargement of the mold until the material is cured, and thereafter removing the footwear from the mold.

2. The method of manufacturing footwear which includes the steps of placing the shoe upper, a pressure moldable elastomeric material and a resilient filler material in a mold, closing the mold, applying pressure to the elastomeric material in the mold to form an outer upstanding peripheral rim and molding the rim directly to the upper while compressing the resilient filler material, thereafter enlarging the mold thereby reducing the pressure in the mold to permit the filler material to expand in the mold, maintaining the enlargement of the mold and curing the elastomeric material, and thereafter removing the footwear from the mold.

3. The method of manufacturing footwear which includes the steps of placing a shoe upper and a pressure moldable elastomeric material to form a solid upstanding peripheral rim and an elastomeric material including a blowing agent to form an inner porous mass in a mold, closing the mold, applying heat and pressure to the elastomeric material in the mold to at least partially cure the material to first form the solid upstanding peripheral rim and mold the rim to the shoe upper, thereafter reducing the pressure on the elastomeric material to permit the remaining portion of the material to expand in the mold to form the inner porous mass between the solid upstanding rim and the shoe upper, maintaining the reduced pressure in the mold and continuing the application of heat to cure all of the material, and thereafter removing the footwear from the mold.

4. The method as set forth in claim 3 further characterized in that a strip of preformed material is placed between the elastomeric material to form the solid upstanding peripheral rim and the elastomeric material to form the inner porous mass to maintain said materials separated while in the mold.

5. The method as set forth in claim 3 further characterized in that the pressure moldable elastomeric material which forms the solid upstanding peripheral rim comprises a derivative of diisocyanate.

References Cited

UNITED STATES PATENTS

| | | | |
|---|---|---|---|
| 1,515,475 | 11/1924 | Goodwin | 264—55 X |
| 2,763,897 | 9/1956 | Gates et al. | 264—55 |
| 2,769,205 | 11/1956 | Pfleumer | 264—55 |
| 1,409,059 | 3/1922 | Miller | 156—78 |
| 2,530,289 | 11/1950 | Cook | 264—54 |
| 2,694,871 | 11/1954 | Rollman | 264—45 X |
| 2,898,626 | 8/1959 | Alderfer et al. | 264—47 X |
| 3,058,161 | 10/1962 | Beyer et al. | 264—47 |
| 2,878,523 | 3/1959 | Hardy | 264—54 X |
| 3,007,209 | 11/1961 | Roberts | 264—55 X |

FOREIGN PATENTS

| | | |
|---|---|---|
| 487,437 | 12/1953 | Italy. |
| 1,013,424 | 7/1952 | France. |
| 1,016,862 | 11/1952 | France. |
| 1,132,677 | 3/1957 | France. |

OTHER REFERENCES

Bjorksten, Johan: "Polyurethane resins," in Modern Plastics, April 1954, pp. 143, 144, 146, 228, 229, 230, 233.

JAMES A. SEIDLECK, *Primary Examiner.*

ALEXANDER H. BRODMERKEL, ROBERT F. WHITE, *Examiners.*

P. E. ANDERSON, *Assistant Examiner.*